US009853564B2

(12) United States Patent
Kang et al.

(10) Patent No.: US 9,853,564 B2
(45) Date of Patent: Dec. 26, 2017

(54) SYNCHRONOUS RECTIFIER AND CONTROL CIRCUIT THEREOF

(71) Applicants: Samsung Electro-Mechanics Co., Ltd., Suwon-si (KR); Research & Business Foundation Sungkyunkwan University, Suwon-si (KR)

(72) Inventors: Chang Soo Kang, Suwon-si (KR); Chul Gyun Park, Suwon-si (KR); Young Jun Park, Mungyeong-si (KR); Kang Yoon Lee, Seoul (KR)

(73) Assignees: Samsung Electro-Mechanics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/051,031

(22) Filed: Feb. 23, 2016

(65) Prior Publication Data
US 2016/0380555 A1 Dec. 29, 2016

(30) Foreign Application Priority Data

Jun. 24, 2015 (KR) .................. 10-2015-0089976

(51) Int. Cl.
*H02M 7/217* (2006.01)
*H02M 7/219* (2006.01)
*H02M 1/08* (2006.01)

(52) U.S. Cl.
CPC .... *H02M 7/219* (2013.01); *H02M 2007/2195* (2013.01); *Y02B 70/1408* (2013.01)

(58) Field of Classification Search
CPC ........ H02M 1/08; H02M 1/081; H02M 7/217; H02M 2007/2195
See application file for complete search history.

(56) References Cited

U.S. PATENT DOCUMENTS 5,838,558 A 11/1998 Tan et al.
9,577,539 B2 * 2/2017 Sakita ............... H02M 3/33523
(Continued)

FOREIGN PATENT DOCUMENTS

| JP | 11-134042 A | 5/1999 |
| JP | 2012-143135 A | 7/2012 |
| KR | 1998-086689 A | 12/1998 |

OTHER PUBLICATIONS

Truong Thi Kim Nga, et al., "A High Efficiency Active Rectifier for 6.78MHz Wireless Power Transfer Receiver with Bootstrapping Technique and All Digital Delay-Locked Loop," *IEIE Transactions on Smart Processing and Computing*, vol. 3, No. 6, Dec. 2014, pp. 410-415.
(Continued)

*Primary Examiner* — Timothy J Dole
*Assistant Examiner* — Sisay G Tiku
(74) *Attorney, Agent, or Firm* — NSIP Law

(57) ABSTRACT

A synchronous rectifier includes: a rectifying circuit including transistors, the rectifying circuit being configured to generate rectified power by rectifying input power input to an input terminal of the rectifying circuit depending on switching operations of the transistors, and output the rectified power to an output terminal of the rectifying circuit; and a controller configured to apply a gate signal to each of the, and adjust a pulse width of the gate signal depending on a difference between the input power and the gate signal.

18 Claims, 5 Drawing Sheets

(56) References Cited

U.S. PATENT DOCUMENTS

| | | | | |
|---|---|---|---|---|
| 2009/0213623 A1* | 8/2009 | Yang | ................ | H02M 3/33507 |
| | | | | 363/49 |
| 2009/0244937 A1* | 10/2009 | Liu | ................... | H02M 1/4216 |
| | | | | 363/46 |
| 2011/0149622 A1* | 6/2011 | Lin | ................... | H02M 1/4208 |
| | | | | 363/124 |
| 2011/0199061 A1* | 8/2011 | Shimada | ................ | G05F 1/445 |
| | | | | 323/237 |
| 2012/0127765 A1* | 5/2012 | Maruyama | ............. | H02J 5/005 |
| | | | | 363/126 |
| 2012/0326515 A1* | 12/2012 | Murai | ................... | H02J 5/005 |
| | | | | 307/72 |
| 2015/0117076 A1* | 4/2015 | Zhang | ................ | H02M 7/219 |
| | | | | 363/127 |
| 2015/0146466 A1* | 5/2015 | Kim | ................... | H02M 7/219 |
| | | | | 363/127 |

OTHER PUBLICATIONS

Korean Office Action dated Aug. 19, 2016, in counterpart Korean Application No. 10-2015-0089976 (5 pages in English, 3 pages in Korean).

\* cited by examiner

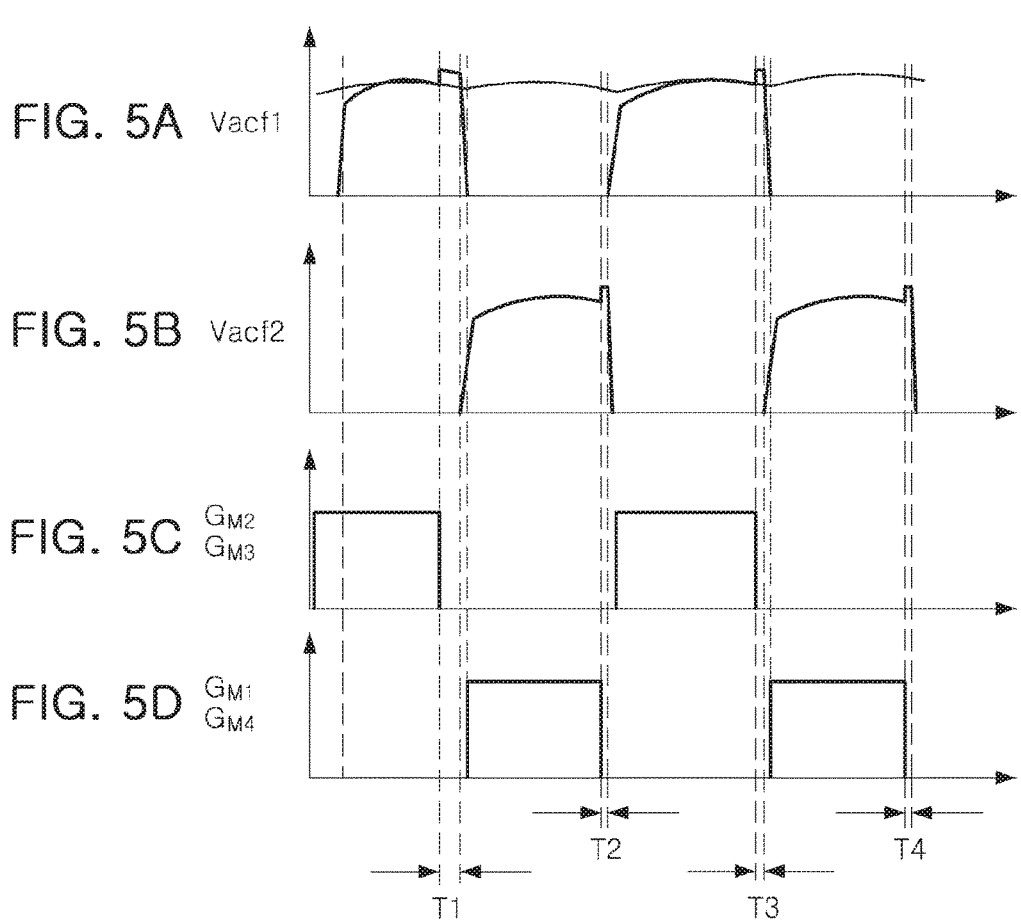

SYNCHRONOUS RECTIFIER AND CONTROL CIRCUIT THEREOF

CROSS-REFERENCE TO RELATED APPLICATION(S)

This application claims the benefit of Korean Patent Application No. 10-2015-0089976 filed on Jun. 24, 2015 in the Korean Intellectual Property Office, the entire disclosure of which is incorporated herein by reference for all purposes.

BACKGROUND

1. Field

The following description relates to a synchronous rectifier and a control circuit thereof.

2. Description of Related Art

A synchronous rectifier is a device for half-wave-rectifying or full-wave-rectifying input alternating current (AC) power to convert the input AC power into direct current (DC) power. Generally, a bridge rectifier in which a plurality of diodes are connected to each other in a bridge form is used in order to rectify AC power. However, the bridge rectifier has a problem in that rectifying efficiency is low due to threshold voltages of the diodes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a synchronous rectifier includes: a rectifying circuit including transistors, the rectifying circuit being configured to generate rectified power by rectifying input power input to an input terminal of the rectifying circuit depending on switching operations of the transistors, and output the rectified power to an output terminal of the rectifying circuit; and a controller configured to apply a gate signal to each of the, and adjust a pulse width of the gate signal depending on a difference between the input power and the gate signal.

The rectifying circuit may include: a first transistor connected to a ground; a second transistor connected to the ground; a third transistor disposed between the first transistor and the output terminal; and a fourth transistor disposed between the second transistor and the output terminal.

The controller may include: an input power detector configured to detect the input power; a pulse width modulation (PWM) signal generator configured to generate PWM signals maintained at a high level during reference times from start points in time of a positive level and a negative level of the input power detected in the input power detector; a gate signal generator configured to generate the gate signals provided to the transistors depending on the PWM signals; and a comparing device configured to compare the input power to the gate signals to generate compensation signals. The PWM signal generator may be configured to adjust pulse widths of the PWM signals depending on the compensation signals.

The PWM signals may include: a first PWM signal maintained at the high level during the reference time from the start point in time of the positive level of the input power; and a second PWM signal maintained at the high level during the reference time from the start point in time of the negative level of the input power.

The comparing device may be configured to: compare a section of a high level of a gate signal generated depending on the first PWM signal to a section of the positive level of the input power to generate a first compensation signal among the compensation signals; and compare a section of a high level of a gate signal generated depending on the second PWM signal to a section of the negative level of the input power to generate a second compensation signal among the compensation signals.

The PWM signal generator may be configured to adjust a pulse width of the first PWM signal depending on the first compensation signal, and adjust a pulse width of the second PWM signal depending on the second compensation signal.

The generating of the first compensation signal may include: generating a first rise compensation signal in response to the section of the positive level of the input power being larger than the section of the high level of the gate signal generated depending on the first PWM signal; and generating a first fall compensation signal in response to the section of the positive level of the input power being smaller than the section of the high level of the gate signal generated depending on the first PWM signal.

The PWM signal generator may be configured to increase a pulse width of the first PWM signal depending on the first rise compensation signal, and decrease the pulse width of the first PWM signal depending on the first fall compensation signal.

The generating of the second compensation signal may include: generating a second rise compensation signal in response to the section of the negative level of the input power being larger than the section of the high level of the gate signal generated depending on the second PWM signal; and generating a second fall compensation signal in response to the section of the negative level of the input power being smaller than the section of the high level of the gate signal generated depending on the second PWM signal.

The PWM signal generator may be configured to increase a pulse width of the second PWM signal depending on the second rise compensation signal, and decrease the pulse width of the second PWM signal depending on the second fall compensation signal.

The input power may be alternating current (AC) power.

According to another general aspect, a control circuit for a synchronous rectifier includes: an input power detector configured to detect input power input to transistors performing a rectifying operation; a PWM signal generator configured to generate PWM signals maintained at a high level during reference times from start points in time of a positive level and a negative level of the input power detected in the input power detector; a gate signal generator configured to generate gate signals provided to the transistors depending on the PWM signals; and a comparing device configured to compare the input power to the gate signals to generate compensation signals, wherein the PWM signal generator is configured to adjust pulse widths of the PWM signals depending on the compensation signals.

The PWM signals may include: a first PWM signal maintained at the high level during the reference time from the start point in time of the positive level of the input power; and a second PWM signal maintained at the high level during the reference time from the start point in time of the negative level of the input power.

The comparing device may be configured to: compare a section of a high level of a gate signal generated depending on the first PWM signal to a section of the positive level of the input power with each other to generate a first compensation signal among the compensation signals; and compare a section of a high level of a gate signal generated depending on the second PWM signal to a section of the negative level of the input power to generate a second compensation signal among the compensation signals. The PWM signal generator may be configured to adjust a pulse width of the first PWM signal depending on the first compensation signal, and adjust a pulse width of the second PWM signal depending on the second compensation signal.

The generating of the first compensation signal may include: generating a first rise compensation signal in response to the section of the positive level of the input power being larger than the section of the high level of the gate signal generated depending on the first PWM signal; and generating a first fall compensation signal in response to the section of the positive level of the input power being smaller than the section of the high level of the gate signal generated depending on the first PWM signal.

The PWM signal generator may be configured to increase a pulse width of the first PWM signal depending on the first rise compensation signal, and decrease the pulse width of the first PWM signal depending on the first fall compensation signal.

The generating of the second compensation signal may include: generating a second rise compensation signal in response to the section of the negative level of the input power being larger than the section of the high level of the gate signal generated depending on the second PWM signal; and generating a second fall compensation signal in response to the section of the negative level of the input power being smaller than the section of the high level of the gate signal generated depending on the second PWM signal.

The PWM signal generator may be configured to increase a pulse width of the second PWM signal depending on the second rise compensation signal, and decrease the pulse width of the second PWM signal depending on the second fall compensation signal.

Other features and aspects will be apparent from the following detailed description, the drawings, and the claims.

BRIEF DESCRIPTION OF THE DRAWINGS

FIGS. 5A through 5D are waveform diagrams of main portions of the synchronous rectifier of FIG. 3.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
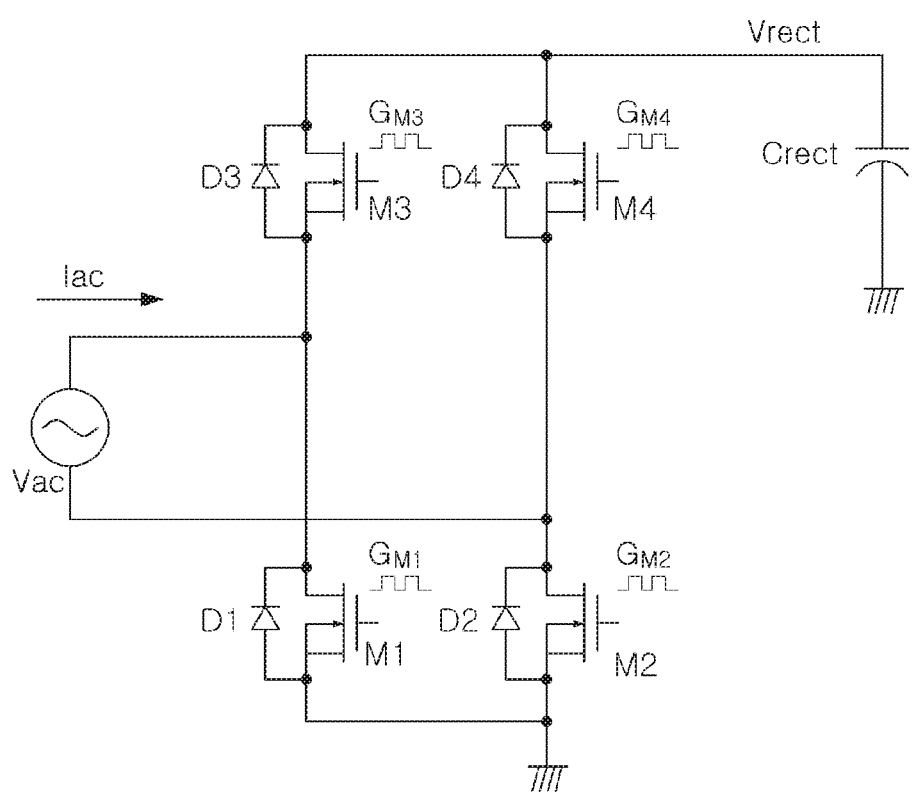
FIG. 1 is a circuit diagram illustrating an example of a rectifying circuit of a synchronous rectifier.

FIG. 1 is a circuit diagram illustrating an example of a rectifying circuit 100 of a synchronous rectifier. Referring to FIG. 1, the rectifying circuit 100 rectifies input power, which is alternating current (AC) power, to generate a rectified voltage Vrect. The rectified voltage Vrect generated by the rectifying circuit 100 is transferred to a rectifying capacitor Crect. Although not illustrated in FIG. 1, a voltage charged in the rectifying capacitor Crect may be supplied to a load connected to the rectifying capacitor Crect.

The rectifying circuit 100 includes a plurality of transistors M1 to M4. The four transistors M1 to M4 are disposed in a bridge form. The first and third transistors M1 and M3 are connected to each other in series between a ground and an output terminal of the rectifying circuit 100, and the second and fourth transistors M2 and M4 are connected to each other in series between the ground and the output terminal of the rectifying circuit 100. Reverse current preventing diodes D1 to D4 are connected, respectively, to the first to fourth transistors M1 to M4 in parallel.

One end of an input power supply is connected to a connection node between the first and third transistors M1 and M3, and the other end of the input power supply is connected to a connection node between the second and fourth transistors M2 and M4.

The first to fourth transistors M1 to M4 are switched by gate signals $G_{M1}$ to $G_{M4}$, respectively. The second and third gate signals $G_{M2}$ and $G_{M3}$ may be the same as each other, and first and fourth gate signals $G_{M1}$ and $G_{M4}$ may be the same as each other. The period while the levels of the second and third gate signals $G_{M2}$ and $G_{M3}$ are high does not overlap the period while the levels of the first and fourth gate signals $G_{M1}$ and $G_{M4}$ are high.

In a case in which the second and third gate signals $G_{M2}$ and $G_{M3}$ are high signals and the first and fourth gate signals $G_{M1}$ and $G_{M4}$ are low signals, the second and third transistors M2 and M3 are turned on, and the first and fourth transistors M1 and M4 are turned off. In addition, in a case in which the first and fourth gate signals $G_{M1}$ and $G_{M4}$ are high signals and the second and third gate signals $G_{M2}$ and $G_{M3}$ are low signals, the first and fourth transistors M1 and M4 are turned on, and the second and third transistors M2 and M3 are turned off. The rectified voltage Vrect is charged in the rectifying capacitor Crect depending on switching operations of the first to fourth transistors M1 to M4.

In a case in which an input voltage Vac and an input current Iac of the input power are at a positive level, the rectifying circuit 100 is operated at maximum efficiency when the second and third transistors M2 and M3 are turned on and the first and fourth transistors M1 and M4 are turned off. Likewise, in a case in which an input voltage Vac and an input current Iac of the input power are at a negative level, the rectifying circuit 100 is operated at maximum efficiency when the second and third transistors M2 and M3 are turned off and the first and fourth transistors M1 and M4 are turned on.

Figure 2:
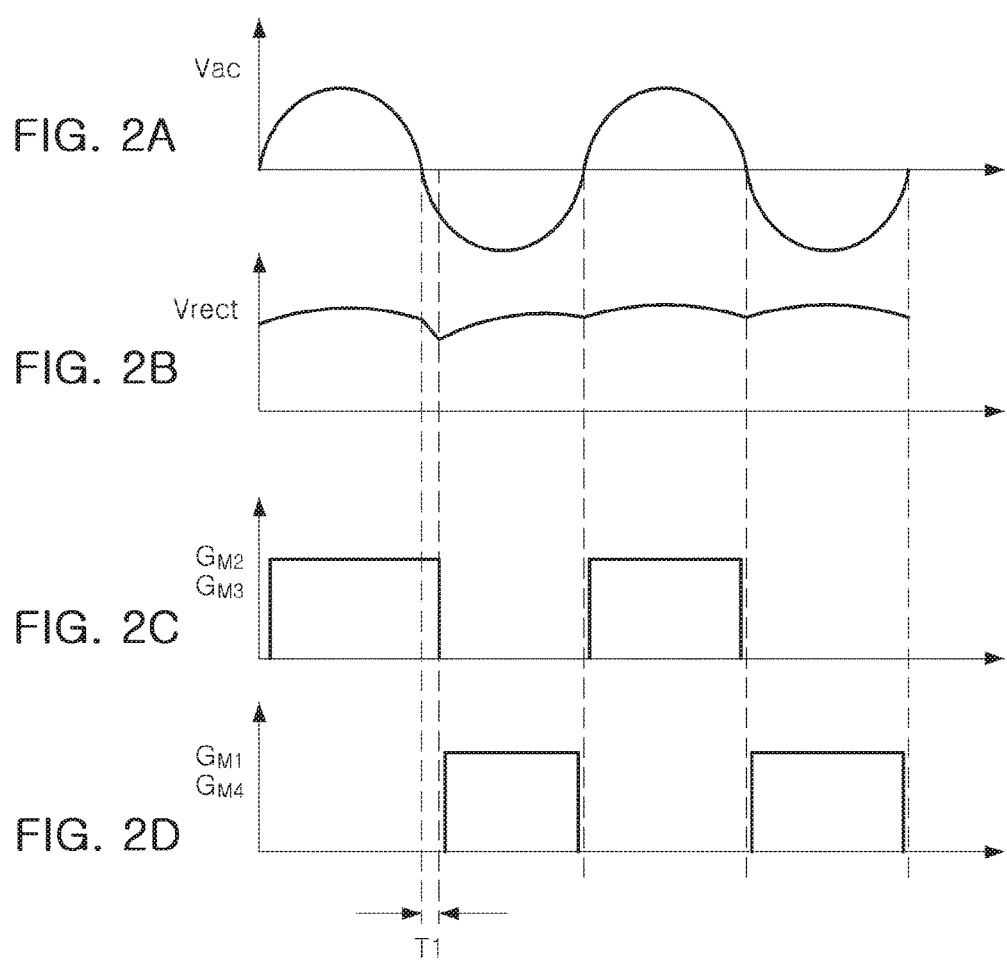
FIGS. 2A through 2D are waveform diagrams of main portions of the rectifying circuit 100 of FIG. 1.

FIGS. 2A through 2D are examples of waveform diagrams of main portions of the rectifying circuit 100 of FIG. 1. Specifically, FIG. 2A is a waveform diagram of the input voltage Vac, FIG. 2B is a waveform diagram of the rectified voltage Vrect, FIG. 2C is a waveform diagram of the gate signals $G_{M2}$ and $G_{M3}$ applied to the second and third transistors M2 and M3, and FIG. 2D is a waveform diagram of the gate signals $G_{M1}$ and $G_{M4}$ applied to the first and fourth transistors M1 and M4.

Referring to FIGS. 2A through 2D, in a section T1, the input voltage Vac is at a negative level and the second and third gate signals $G_{M2}$ and $G_{M3}$ are at a high level. That is, a section of a positive level of the input voltage Vac and a section of a high level of the second and third gate signals $G_{M2}$ and $G_{M3}$ do not coincide with each other. In this case, the second and third transistors M2 and M3 are turned on, and thus some of the rectified voltage Vrect is discharged. As a result, the rectifying circuit 100 is not operated at maximum efficiency.

According to an example embodiment, phases of the input voltage Vac and the input current Iac of the input power and phases of the gate signals $G_{M1}$ to $G_{M4}$ are synchronized with each other to achieve maximum efficiency of a rectifying operation of the rectifying circuit 100.

Figure 3:
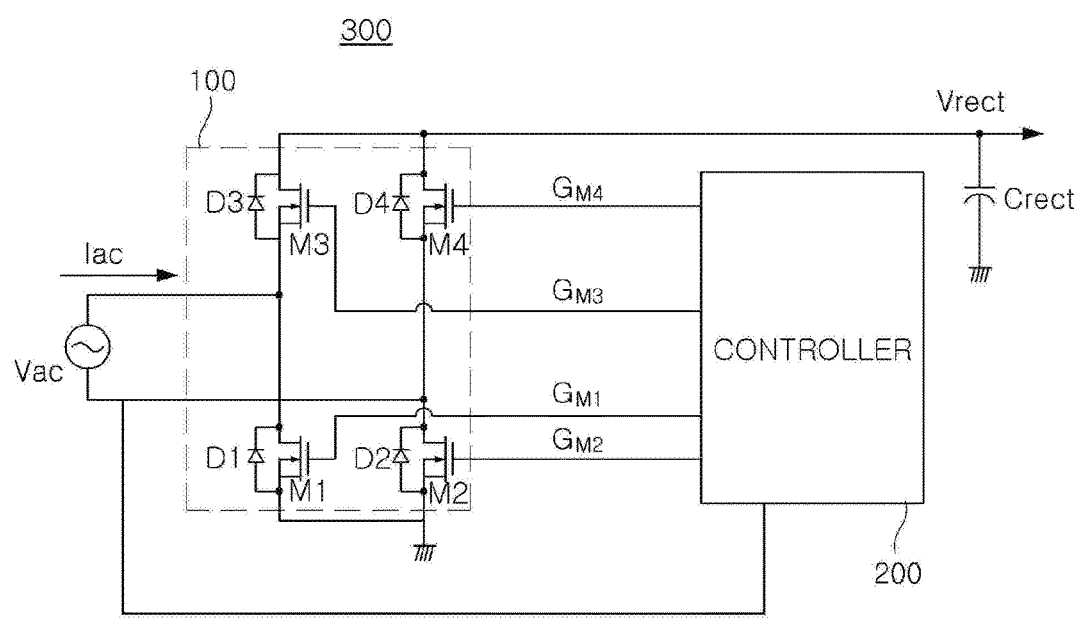
FIG. 3 is a view illustrating a synchronous rectifier according to an embodiment.
Figure 4:
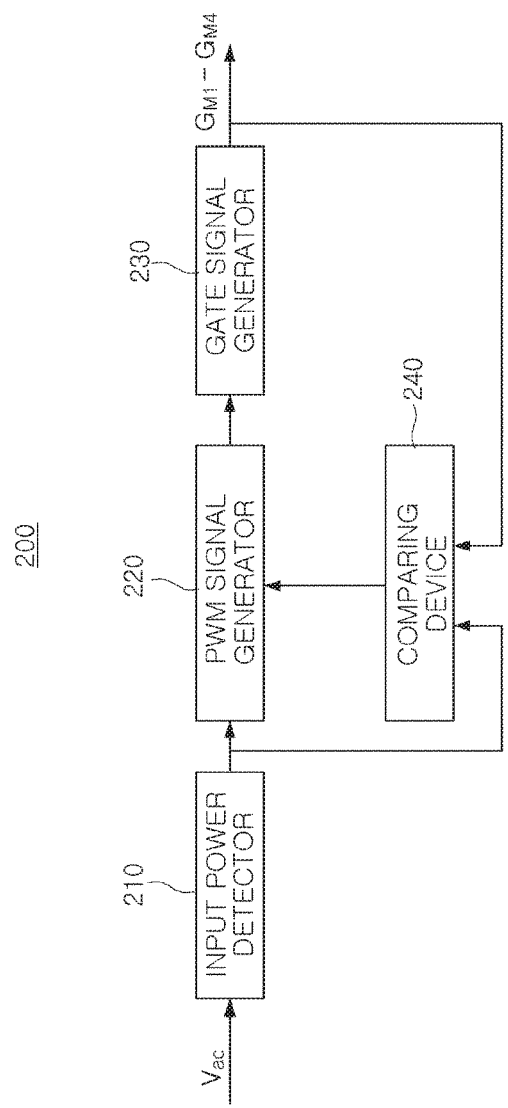
FIG. 4 is a block diagram illustrating a controller of the synchronous rectifier of FIG. 3.

FIG. 3 is a view illustrating a synchronous rectifier 300 according to an embodiment, and FIG. 4 is a block diagram illustrating a controller 200 of the synchronous rectifier 300 according to an embodiment.

Referring to FIG. 3, the synchronous rectifier 300 includes the rectifying circuit 100 and the controller 200 (which may also be called a "control circuit"). Since a configuration and an operation of the rectifying circuit 100 of FIG. 3 are the same as those of the rectifying circuit 100 of FIG. 1, an overlapping description thereof will be omitted, and a difference between the rectifier 300 of FIG. 3 and the rectifying circuit 100 of FIG. 1 will mainly be described.

Referring to FIG. 4, the controller 200 includes an input power detector 210, a pulse width modulation (PWM) signal generator 220, a gate signal generator 230, and a comparing device 240.

The input power detector 210 detects information on the input voltage Vac of the input power. The input power detector 210 includes a filtering element to detect the information on the input voltage Vac depending on a first filtering voltage and a second filtering voltage generated by filtering the input voltage Vac. As an example, the input power detector 210 detects a voltage level, a phase, and duty sections of positive and negative levels of the input voltage Vac.

The PWM signal generator 220 generates PWM signals depending on the information on the input voltage Vac detected from the input power detector 210.

The PWM signal generator 220 generates the PWM signals maintained at a high level during a reference time from at least one of a switching point in time from a positive level of the input voltage Vac to a negative level of the input voltage Vac (i.e., a start point in time of the negative level), and a switching point in time from the negative level of the input voltage to the positive level of the input voltage Vac (i.e., a start point in time of the positive level). The PWM signal generator 220 includes two PWM signal generators. One of the two PWM signal generators generates a first PWM signal maintained at a high level during a reference time from the switching point in time from the negative level of the input voltage Vac to the positive level of the input voltage Vac. The other of the two PWM signal generators generates a second PWM signal maintained at a high level during a reference time from the switching point in time from the positive level of the input voltage Vac to the negative level of the input voltage Vac.

The gate signal generator 230 generates the gate signals $G_{M1}$ to $G_{M4}$ provided to the first to fourth transistors M1 to M4 using the first and second PWM signals generated in the PWM signal generator 220. Specifically, the gate signal generator 230 generates the second and third gate signals $G_{M2}$ and $G_{M3}$ provided to the second and third transistors M2 and M3 using the first PWM signal, and generates the first and fourth gate signals $G_{M1}$ and $G_{M4}$ provided to the first and fourth transistors M1 and M4 using the second PWM signal.

The gate signal generator 230 may include a boosting circuit to amplify the gate signals $G_{M3}$ and $G_{M4}$ respectively applied to the third and fourth transistors M3 and M4. According to an embodiment, the gate signals $G_{M3}$ and $G_{M4}$ respectively applied to the third and fourth transistors M3 and M4 can be amplified, and thus a voltage difference between gates and sources of the transistors M3 and M4 disposed at a high voltage side can be maintained at a predetermined voltage level. Thereby, a turned-on condition of the transistors M3 and M4 can be secured.

The comparing device 240 compares the input voltage Vac to the gate signals $G_{M1}$ to $G_{M4}$ to generate compensation signals. For example, the comparing device 240 compares the duty of the input voltage Vac detected by the input power detector 210 to the duty of the gate signals $G_{M1}$ to $G_{M4}$ generated by the gate signal generator 230 to generate the compensation signals. For example, the comparing device 240 compares the phase of the input voltage Vac to the phases of the gate signals $G_{M1}$ to $G_{M4}$ to generate the compensation signals.

The comparing device 240 compares the section of the positive level of the input voltage Vac and a section of the high level of the second and third gate signals $G_{M2}$ and $G_{M3}$ to generate a first compensation signal corresponding to a time section in which a difference is present between the section of the positive level of the input voltage Vac and the section of the high level of the second and third gate signals $G_{M2}$ and $G_{M3}$. The first compensation signal includes a first rise compensation signal and a first fall compensation signal.

The first rise compensation signal and the first fall compensation signal are transferred to the PWM signal generator 220, and the PWM signal generator 220 adjusts a section of a high level of the first PMW signal depending on the first rise compensation signal and the first fall compensation signal.

In detail, the comparing device 240 generates the first rise compensation signal in a case in which the section of the positive level of the input voltage Vac is larger than the section of the high level of the second and third gate signals $G_{M2}$ and $G_{M3}$, and the PWM signal generator 220 increases the section of the high level of the first PWM signal by advancing a generation point in time of the high level of the first PWM signal or lagging an end point in time of the section of the high level of the first PWM signal depending on the first rise compensation signal in a case in which the first rise compensation signal is provided.

In addition, the comparing device 240 generates the first fall compensation signal in a case in which the section of the positive level of the input voltage Vac is smaller than the section of the high level of the second and third gate signals $G_{M2}$ and $G_{M3}$, and the PWM signal generator 220 decreases the section of the high level of the first PWM signal by lagging the generation point in time of the high level of the first PWM signal or advancing the end point in time of the section of the high level of the first PWM signal depending on the first fall compensation signal in a case in which the first fall compensation signal is provided.

The comparing device 240 compares a section of the negative level of the input voltage Vac to a section of the high level of the first and fourth gate signals $G_{M1}$ and $G_{M4}$ to generate a second compensation signal corresponding to a time section in which a difference is present between the section of the negative level of the input voltage Vac and the section of the high level of the first and fourth gate signals $G_{M1}$ and $G_{M4}$. The second compensation signal includes a second rise compensation signal and a second fall compensation signal.

The second rise compensation signal and the second fall compensation signal are transferred to the PWM signal generator 220, and the PWM signal generator 220 adjusts a section of a high level of the second PMW signal depending on the second rise compensation signal and the second fall compensation signal.

In detail, the comparing device 240 generates the second rise compensation signal in a case in which the section of the negative level of the input voltage Vac is larger than the section of the high level of the first and fourth gate signals $G_{M1}$ and $G_{M4}$, and the PWM signal generator 220 increases the section of the high level of the second PWM signal by advancing a generation point in time of the high level of the second PWM signal or lagging an end point in time of the section of the high level of the second PWM signal depending on the second rise compensation signal in a case in which the second rise compensation signal is provided.

In addition, the comparing device 240 generates the second fall compensation signal in a case in which the section of the positive level of the input voltage Vac is smaller than the section of the high level of the first and fourth gate signals $G_{M1}$ and $G_{M4}$, and the PWM signal generator 220 decreases the section of the high level of the second PWM signal by lagging the generation point in time of the high level of the second PWM signal or advancing the end point in time of the section of the high level of the second PWM signal depending on the second fall compensation signal in a case in which the second fall compensation signal is provided.

FIGS. 5A through 5D are examples of waveform diagrams of main portions of the synchronous rectifier 300 according to an embodiment. FIGS. 5A and 5B are, respectively, example waveform diagrams of the first filtering voltage Vacf1 and the second filtering voltage Vacf2 generated by filtering the input voltage Vac in the input power detector. FIG. 5C is an example waveform diagram of the gate signals $G_{M2}$ and $G_{M3}$ applied to the second and third transistors M2 and M3, respectively. FIG. 5D is an example waveform diagram of the gate signals $G_{M1}$ and $G_{M4}$ applied to the first and fourth transistors M1 and M4, respectively. The first filtering voltage Vacf1 and the second filtering voltage Vacf2 of FIG. 5A and FIG. 5B have, respectively, voltage waveforms corresponding to the positive level and the negative level of the input voltage Vac.

In a section T1, the first filtering voltage Vacf1 is at the positive level, while the second and third gate signals $G_{M1}$ and $G_{M3}$ are at the low level. That is, in the section T1, a section of the positive level of the first filtering voltage Vacf1 and a section of the high level of the second and third gate signals $G_{M2}$ and $G_{M3}$ do not coincide with each other, and thus a voltage level of the first filtering voltage Vacf1 rises abnormally.

As described above, the comparing device 240 according to an embodiment compares the section of the positive level of the input voltage Vac to the section of the high level of the second and third gate signals $G_{M2}$ and $G_{M3}$. Since the section of the positive level of the input voltage Vac is larger than the section of the high level of the second and third gate signals $G_{M2}$ and $G_{M3}$, the comparing device 240 generates the first rise compensation signal. The PWM signal generator 220 lags the end point in time of the section of the high level of the first PWM signal since the first rise compensation signal is provided.

In a section T3, the second and third gate signals $G_{M2}$ and $G_{M3}$, of which the section of the high level is increased, are generated due to the first PWM signal, of which the section of the high level is increased. Thus, a section in which the section of the positive level of the input voltage Vac and the section of the high level of the second and third gate signals $G_{M2}$ and $G_{M3}$ do not coincide is decreased. Accordingly, the input power is efficiently rectified.

As set forth above, in the synchronous rectifier and the control circuit thereof disclosed herein, the phase of the input power and the phases of the gate signals of the transistors performing the rectifying operation are synchronized with each other, thereby performing a high efficiency rectifying operation.

The apparatuses, units, modules, devices, and other components illustrated in FIGS. 3 and 4 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A synchronous rectifier comprising:
   a rectifying circuit comprising transistors, the rectifying circuit being configured to generate rectified power by rectifying input voltage input to an input terminal of the rectifying circuit depending on switching operations of the transistors, and to output the rectified power to an output terminal of the rectifying circuit; and
   a controller comprising
      a pulse width modulation (PWM) signal generator configured to generate PWM signals maintained at a high level during reference times from start points in time of a positive level and a negative level of the input voltage,
      a gate signal generator configured to generate gate signals based on the PWM signals, and to apply the gate signals to the transistors, and
      a comparing device configured to compare a phase of the input voltage to phases of the gate signals to determine difference between the phase of the input voltage and the phases of the gate signals, and to generate compensation signals based on the determined differences between the phase of the input voltage and the phases of the gate signals,
   wherein the PWM signal generator is configured to adjust pulse widths of the PWM signals based on the compensation signals.

2. The synchronous rectifier of claim 1, wherein the rectifying circuit comprises:
   a first transistor connected to a ground;
   a second transistor connected to the ground;
   a third transistor disposed between the first transistor and the output terminal; and
   a fourth transistor disposed between the second transistor and the output terminal.

3. The synchronous rectifier of claim 1, wherein the controller further comprises an input power detector configured to detect the input voltage.

4. The synchronous rectifier of claim 3, wherein the PWM signals comprise:
   a first PWM signal maintained at the high level during the reference time from the start point in time of the positive level of the input voltage; and
   a second PWM signal maintained at the high level during the reference time from the start point in time of the negative level of the input voltage.

5. The synchronous rectifier of claim 4, wherein the comparing device is configured to:
   compare a section of a high level of a gate signal generated depending on the first PWM signal to a section of the positive level of the input voltage to generate a first compensation signal among the compensation signals; and
   compare a section of a high level of a gate signal generated depending on the second PWM signal to a section of the negative level of the input voltage to generate a second compensation signal among the compensation signals.

6. The synchronous rectifier of claim 5, wherein the PWM signal generator is configured to adjust a pulse width of the first PWM signal depending on the first compensation signal, and adjust a pulse width of the second PWM signal depending on the second compensation signal.

7. The synchronous rectifier of claim 5, wherein the generating of the first compensation signal comprises:
   generating a first rise compensation signal in response to the section of the positive level of the input voltage being larger than the section of the high level of the gate signal generated depending on the first PWM signal; and
   generating a first fall compensation signal in response to the section of the positive level of the input voltage being smaller than the section of the high level of the gate signal generated depending on the first PWM signal.

8. The synchronous rectifier of claim 7, wherein the PWM signal generator is configured to increase a pulse width of the first PWM signal depending on the first rise compensation signal, and decrease the pulse width of the first PWM signal depending on the first fall compensation signal.

9. The synchronous rectifier of claim 5, wherein the generating of the second compensation signal comprises:
   generating a second rise compensation signal in response to the section of the negative level of the input voltage being larger than the section of the high level of the gate signal generated depending on the second PWM signal; and
   generating a second fall compensation signal in response to the section of the negative level of the input voltage being smaller than the section of the high level of the gate signal generated depending on the second PWM signal.

10. The synchronous rectifier of claim 9, wherein the PWM signal generator is configured to increase a pulse width of the second PWM signal depending on the second rise compensation signal, and decrease the pulse width of the second PWM signal depending on the second fall compensation signal.

11. The synchronous rectifier of claim 1, wherein the input voltage is alternating current (AC) voltage.

12. A control circuit for a synchronous rectifier, comprising:
   an input power detector configured to detect input voltage input to transistors performing a rectifying operation;
   a PWM signal generator configured to generate PWM signals maintained at a high level during reference times from start points in time of a positive level and a negative level of the input voltage detected in the input power detector;
   a gate signal generator configured to generate gate signals provided to the transistors depending on the PWM signals; and
   a comparing device configured to compare a phase of the input voltage to phases of the gate signals to determine differences between the phase of the input voltage and the phases of the gate signals, and to generate compensation signals based on the determined differences between the phase of the input voltage and the phases of the gate signals,
   wherein the PWM signal generator is configured to adjust pulse widths of the PWM signals based the compensation signals.

13. The control circuit for a synchronous rectifier of claim 12, wherein the PWM signals comprise:
   a first PWM signal maintained at the high level during the reference time from the start point in time of the positive level of the input voltage; and
   a second PWM signal maintained at the high level during the reference time from the start point in time of the negative level of the input voltage.

14. The control circuit for a synchronous rectifier of claim 13, wherein:
the comparing device is configured to:
compare a section of a high level of a gate signal generated depending on the first PWM signal to a section of the positive level of the input voltage with each other to generate a first compensation signal among the compensation signals, and
compare a section of a high level of a gate signal generated depending on the second PWM signal to a section of the negative level of the input voltage to generate a second compensation signal among the compensation signals; and
the PWM signal generator is configured to adjust a pulse width of the first PWM signal depending on the first compensation signal, and adjust a pulse width of the second PWM signal depending on the second compensation signal.

15. The control circuit for a synchronous rectifier of claim 14, wherein the generating of the first compensation signal comprises:
generating a first rise compensation signal in response to the section of the positive level of the input voltage being larger than the section of the high level of the gate signal generated depending on the first PWM signal; and
generating a first fall compensation signal in response to the section of the positive level of the input voltage being smaller than the section of the high level of the gate signal generated depending on the first PWM signal.

16. The control circuit for a synchronous rectifier of claim 15, wherein the PWM signal generator is configured to increase a pulse width of the first PWM signal depending on the first rise compensation signal, and decrease the pulse width of the first PWM signal depending on the first fall compensation signal.

17. The control circuit for a synchronous rectifier of claim 14, wherein the generating of the second compensation signal comprises:
generating a second rise compensation signal in response to the section of the negative level of the input voltage being larger than the section of the high level of the gate signal generated depending on the second PWM signal; and
generating a second fall compensation signal in response to the section of the negative level of the input voltage being smaller than the section of the high level of the gate signal generated depending on the second PWM signal.

18. The control circuit for a synchronous rectifier of claim 17, wherein PWM signal generator is configured to increase a pulse width of the second PWM signal depending on the second rise compensation signal, and decrease the pulse width of the second PWM signal depending on the second fall compensation signal.

* * * * *